(12) United States Patent
Uchiyama

(10) Patent No.: US 10,230,099 B2
(45) Date of Patent: Mar. 12, 2019

(54) POSITIVE ELECTRODE ACTIVE MATERIAL PARTICLES, AND POSITIVE ELECTRODE AND ALL-SOLID-STATE BATTERY USING SAME

(75) Inventor: Takayuki Uchiyama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 73 days.

(21) Appl. No.: 14/117,467

(22) PCT Filed: May 23, 2011

(86) PCT No.: PCT/JP2011/062308
§ 371 (c)(1),
(2), (4) Date: Nov. 13, 2013

(87) PCT Pub. No.: WO2012/160707
PCT Pub. Date: Nov. 29, 2012

(65) Prior Publication Data
US 2015/0024280 A1    Jan. 22, 2015

(51) Int. Cl.
*H01M 4/36* (2006.01)
*H01M 4/505* (2010.01)
(Continued)

(52) U.S. Cl.
CPC .......... *H01M 4/366* (2013.01); *H01M 4/505* (2013.01); *H01M 4/525* (2013.01);
(Continued)

(58) Field of Classification Search
CPC ...................................................... H01M 6/18
See application file for complete search history.

(56) References Cited

U.S. PATENT DOCUMENTS

2002/0110736 A1    8/2002  Kweon et al.
2007/0111098 A1*   5/2007  Yang Kook ........... B01F 7/1675
                                                    429/231.95
(Continued)

FOREIGN PATENT DOCUMENTS

CN    1346160 A       4/2002
CN    101083318 A    12/2007
(Continued)

OTHER PUBLICATIONS

Ohta et. al, "Enhancement of the High-Rate Capability of Solid-State Lithium Batteries by Nanoscale Interfacial Modification", May 25, 2006.*
(Continued)

*Primary Examiner* — Barbara L Gilliam
*Assistant Examiner* — Nathanael T Zemui
(74) *Attorney, Agent, or Firm* — Oliff PLC

(57) ABSTRACT

In a battery production process, a positive electrode active material having a reaction-suppressing layer that does not easily peel off formed on the surface thereof, and a positive electrode and an all-solid-state battery that use said material are provided. The present invention involves positive electrode active material particles for an all-solid-state battery containing sulfide-based solid electrolyte. The positive electrode active material particles are an aggregate containing two or more particles. The surface of the aggregate is coated with a reaction-suppressing layer for suppressing reactions with the sulfide-based solid electrolyte.

10 Claims, 5 Drawing Sheets

(51) Int. Cl.
    *H01M 4/525*      (2010.01)
    *H01M 10/052*      (2010.01)
    *H01M 10/0562*      (2010.01)
    *H01M 4/62*      (2006.01)
    *H01M 4/02*      (2006.01)

(52) U.S. Cl.
CPC ..... *H01M 10/052* (2013.01); *H01M 10/0562* (2013.01); *H01M 4/62* (2013.01); *H01M 2004/028* (2013.01); *H01M 2300/0068* (2013.01)

(56) References Cited

U.S. PATENT DOCUMENTS

| | | | | |
|---|---|---|---|---|
| 2007/0292759 | A1* | 12/2007 | Ugaji | H01M 4/131 429/223 |
| 2009/0081553 | A1* | 3/2009 | Kondo | H01M 2/021 429/314 |
| 2009/0081554 | A1 | 3/2009 | Takada et al. | |
| 2012/0028128 | A1* | 2/2012 | Seino | C01G 45/1228 429/304 |
| 2012/0052396 | A1* | 3/2012 | Tsuchida | H01M 4/131 429/304 |

FOREIGN PATENT DOCUMENTS

| | | | |
|---|---|---|---|
| WO | WO 2007/004590 | 1/2007 | |
| WO | WO 2010107084 A1 * | 9/2010 | ......... C01G 45/1228 |

OTHER PUBLICATIONS

A. M. Kannan, L. Rabenberg, and A. Manthiram, "High Capacity Surface-Modified LiCoO2 Cathodes for Lithium-Ion Batteries", Electrochemical and Solid-State Letters, 6 (1) A16-A18 (2003), Manuscript submitted Jun. 27, 2002; revised manuscript received Sep. 27, 2002. Available electronically Nov. 13, 2002.*

Zhaohui Chen and J. R. Dahn; "Studies of LiCoO2 Coated with Metal Oxides"; Available electronically Aug. 28, 2003; Electrochemical and Solid-State Letters, 6 (11) A221-A224 (2003).*

Ohta et al., "LiNbO3-coated LiCoO2 as Cathode Material for all Solid-State Lithium Secondary Batteries," *Science Direct*, Feb. 20, 2007, p. 1486-1490.

Sakuda et al., "All-Solid-State Lithium Secondary Batteries With Oxide-Coated LiCoO2 Electrode and Li2S—P2S5 Electrolyte," *Journal of Power Sources*, p. 527-530.

Sakuda et al., "Modification of Interface Between LiCoO2 Electrode and Li2S—P255 Solid Electrolyte Using Li2O—SiO2 Glassy Layers", Journal of the Electrochemical Society, 2009, pp. A27-A32, vol. 156, No. 1.

\* cited by examiner

POSITIVE ELECTRODE ACTIVE MATERIAL PARTICLES, AND POSITIVE ELECTRODE AND ALL-SOLID-STATE BATTERY USING SAME

TECHNICAL FIELD

The present invention relates to a positive electrode active material particle used for a sulfide-based all-solid battery, as well as an electrode and an all-solid battery using the same.

BACKGROUND ART

Recently, secondary batteries have been an essential and important constituent element as power sources of personal computers, video cameras, mobile phones, and the like, or as power sources for automobiles and power storage.

Among secondary batteries, in particular, lithium ion secondary batteries are characterized as having higher energy density than other secondary batteries and operability at high voltage. Accordingly, lithium ion secondary batteries are secondary batteries that can be easily made compact and lightweight and used in information-related equipment and communication equipment. In recent years, lithium ion secondary batteries with high power and high capacity have been under development for use in electric cars and hybrid cars as low-emission vehicles.

Lithium ion secondary batteries or lithium secondary batteries include a positive electrode layer, a negative electrode layer, and a lithium salt-containing electrolyte arranged between the electrodes. The electrolyte is composed of a nonaqueous liquid or a solid. When the electrolyte is a nonaqueous liquid electrolyte, the electrolyte liquid infiltrates into the positive electrode layer, facilitating the formation of the interface between a positive electrode active material constituting the positive electrode layer and the electrolyte, thus easily improving performance. However, it is necessary to dispose a safety device for suppressing temperature increase during a short circuit or mount a system for ensuring safety, such as short circuit prevention, since widely used electrolyte liquids are flammable. In contrast, all-solid batteries, which are batteries entirely composed of solid components by using a solid electrolyte instead of a liquid electrolyte, do not contain any flammable organic solvent. Thus, all-solid batteries are expected to achieve simplification of safety devices and be advantageous in production cost and productivity, and therefore, the development of the batteries is being promoted.

In all-solid batteries in which a solid electrolyte layer is arranged between the positive electrode layer and the negative electrode layer, the electrolyte hardly infiltrates into the positive electrode active material, easily reducing the interface between the positive electrode active material and the electrolyte, since the positive electrode active material and the electrolyte are solid. Therefore, in all-solid batteries, an area of the interface is increased by using, as a positive electrode, a mixture containing a mixed powder obtained by mixing a powdered positive electrode active material and a powdered solid electrolyte.

In particular, as a solid electrolyte for all-solid batteries, a sulfide-based solid electrolyte having excellent lithium ion conductivity has been considered. However, there is a problem of an easily increasing interface resistance during the movement of lithium ions on the interface between the active material and the sulfide-based solid electrolyte. The reason for this may be that the reaction between the active material and the sulfide-based solid electrolyte allows a high resistance region to be formed on the surface of the active material. Since an increase in the interface resistance deteriorates the performance of all-solid battery, some techniques for suppressing an increase in the interface resistance have been disclosed in the past. One example of the disclosed techniques is reduction of interface resistance by coating of the surface of an active material with lithium niobate or the like (Patent Document 1).

PRIOR ART DOCUMENTS

Patent Document

[Patent Document 1]: International Patent Publication No. WO 2007/004590 (A1)

SUMMARY OF INVENTION

Problems to be Solved by the Invention

As described above, in order to reduce the interface resistance between the active material and the sulfide-based solid electrolyte, a layer for suppressing the reaction between the active material and the sulfide-based solid electrolyte (hereinafter referred to as reaction suppressing layer) can be coated on a surface of the active material particle to produce an electrode for an all-solid battery.

However, there has been a problem in which partial peeling off of a reaction suppressing layer formed on a surface of the positive electrode active material easily occurs due to mechanical energy applied in the kneading and coating of a positive active material, a solid electrolyte, and the like, the pressing of a positive electrode mixture, the solid electrolyte, and a negative electrode mixture, or the like when producing a battery. FIG. 1 depicts a cross-sectional schematic view of an active material particle obtained, in the conventional art, as a result of the mixing and pressing of an active material having a reaction suppressing layer formed on a surface thereof, a solid electrolyte, a conductive assistant, and the like by application of mechanical energy.

As depicted in FIG. 1, on occasions, such as when mixing an active material particle 10 including an active material main body 12 and a reaction suppressing layer 11 formed on a surface thereof with a solid electrolyte and the like in order to produce a positive electrode, or when pressing a positive electrode mixture layer including the active material particle 10, a solid electrolyte layer, and a negative electrode mixture layer in order to produce a battery, the mechanical energy applied easily causes partial peeling off of the reaction suppressing layer 11 from the surface of the active material main body 12. The peeling off of the reaction suppressing layer 11 causes a high resistance region to be formed on the peeled part, which may deteriorate battery performance. Accordingly, a solution to the problem is necessary.

The present invention has been accomplished in view of such new problem. It is an object of the present invention to provide a positive electrode active material particle that does not easily cause the peeling off of a reaction suppressing layer formed on a surface thereof in a process of manufacturing a battery, as well as a positive electrode and an all-solid battery using the same.

Means for Solving the Problems

The present inventors conducted extensive and intensive research on a positive electrode active material that does not easily cause the peeling off of a reaction suppressing layer formed on a surface thereof and conceived an idea of coating a reaction suppressing layer on a positive electrode active material having concave and convex portions formed on a surface thereof.

The present invention is a positive electrode active material particle for an all-solid battery including a sulfide-based solid electrolyte, wherein the positive electrode active material particle is a group including at least two particles and a surface of the group is coated with a reaction suppressing layer for suppressing a reaction with the sulfide-based solid electrolyte.

Effects of the Invention

According to the present invention, the positive electrode active material particle is a group including at least two particles and the group forms concave and convex portions on the surface of the positive electrode active material, thereby making it difficult for the reaction suppressing layer coated on the positive electrode active material to peel off, thus enabling a battery having small reaction resistance to be produced.

DESCRIPTION OF EMBODIMENTS

The present invention is directed to a positive electrode active material particle for an all-solid battery including a lithium ion conductive sulfide-based solid electrolyte as an electrolyte, wherein the positive electrode active material particle is a group including at least two particles and a surface of the group is coated with a reaction suppressing layer for suppressing a reaction with the sulfide-based solid electrolyte.

In the present invention, the group includes at least two particles and the at least two particles may be made of the same ingredient and/or ingredients different from each other. In addition, the at least two particles are not substantially disintegrated by a mixing step for forming a positive electrode material, a pressing step for forming a battery, or any other step.

By forming a positive electrode active material used for an electrode of an all-solid lithium ion battery into a group including at least two particles, concave and convex portions can be formed on a surface of the positive electrode active material. An anchoring effect by the concave and convex portions enables the reaction suppressing layer coated on the surface of the active material as the group to be resistant to peeling off. In particular, although large mechanical energy may be applied to the positive electrode active material in the steps of kneading, coating, pressing, and the like of the positive electrode active material, a solid electrolyte, a conductive assistant, and the like, peeling off of the reaction suppressing layer formed on the surface of the positive electrode active material does not easily occur in the steps.

Figure 1:
FIG. 1 is a cross-sectional schematic view of a positive electrode active material particle obtained, in the conventional art, as a result of mixing, pressing, and the like of an active material having a reaction suppressing layer formed on a surface thereof, a solid electrolyte, a conductive assistant, and the like by application of mechanical energy.
Figure 2:
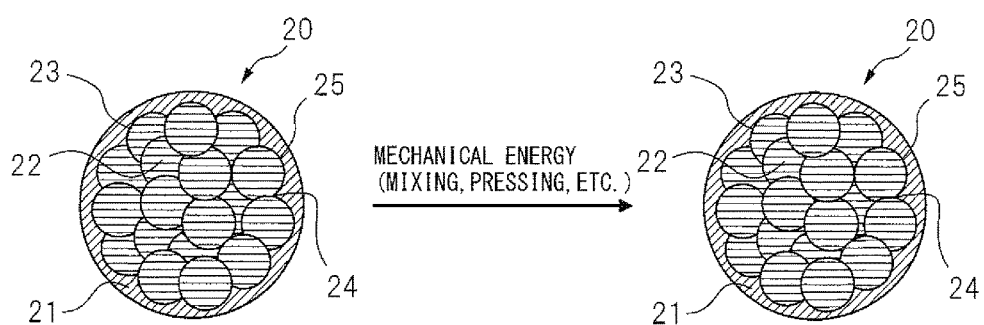
FIG. 2 is a cross-sectional schematic view of a positive electrode active material particle obtained, in an embodiment of the present invention, as a result of mixing, pressing, and the like of an active material composed of a secondary particle as an aggregate of primary particles and having a reaction suppressing layer formed on a surface thereof having concave and convex portions, a solid electrolyte, a conductive assistant, and the like by application of mechanical energy.

In an embodiment of the present invention, a main body of the positive electrode active material particle to be subjected to coating may be a secondary particle formed by aggregation of primary particles of the positive electrode active material. As depicted in FIG. 2, primary particles 22 of a positive electrode active material aggregate to each other to form a secondary particle 23. The secondary particle 23 has concave portions 24 and convex portions 25 and an entire part of the secondary particle 23 is coated with a reaction suppressing layer 21, whereby a positive electrode active material particle 20 of the present invention can be obtained. The secondary particle 23 is not substantially disintegrated by a mixing step of forming a positive electrode material, a pressing step of forming a battery, or any other step, and at least a part of the interface between the primary particles 22 constituting the secondary particle 23 is fused together. Even when mechanical energy is applied to the positive electrode active material particle 20 by mixing, pressing, and the like, the anchoring effect by the concave portions and the convex portions enables the reaction suppressing layer 21 to be resistant to peeling off.

In the present invention, a positive electrode active material secondary particle means a secondary particle formed by aggregation of plural positive electrode active material primary particles. Then, a particle obtained by coating the entire secondary particle with a reaction suppressing layer is referred to as a positive electrode active material particle.

The positive electrode active material secondary particle includes 2 to 1000, preferably 50 to 500 positive electrode active material primary particles in order to obtain the anchoring effect by concave and convex portions. Sizes of the concave and convex portions on the surface of the positive electrode active material particle can be adjusted by adjusting the number of primary particles constituting the secondary particle. The numbers of the concave and convex portions are reduced when the number of the primary particles is too small, whereas the sizes of the concave and convex portions are reduced when the number of the primary particles is too large. The number of primary particles included in the secondary particle can be calculated by SEM observation or the calculation of respective volumes from SEM particle sizes of the secondary particle and the primary particles.

The size of the positive electrode active material secondary particle may have a size generally usable for a positive electrode layer of a lithium secondary battery, and the secondary particle may have a diameter of about 0.6 to 20 μm, preferably about 1 to 10 μm. The primary particles may have a diameter of about 0.3 to 2 μm, and preferably 0.5 to 1 μm.

The positive electrode active material secondary particle used in the present invention can be obtained, for example, by a wet-type precipitation method. In the wet-type precipitation method, an alkaline solution of sodium hydroxide or the like is added to an acidic aqueous solution prepared by dissolving a transition metal-containing salt, such as manganese, nickel, or cobalt in water to obtain a pH of 9 to 13, causing the coprecipitation of a transition metal hydroxide. Then, the precipitate is filtered and dried. Next, lithium hydroxide, lithium carbonate, lithium nitrate, lithium acetate, or the like as a lithium supply source in a dry state is mixed into the coprecipitated hydroxide precursor, and the mixture is calcined at a temperature of 700 to 1200° C. for 1 to 48 hours to obtain positive electrode active material secondary particles. Solid phase reaction is not promoted when the temperature of the thermal treatment is too low, whereas sintering is extremely promoted when the temperature thereof is too high, and thus, both of which are not preferable. Changing the conditions of the pH and temperature when the alkali is added and the calcination temperature allow adjustment of sizes of the primary particles and the secondary particle. A desired secondary particle size may be obtained by pulverizing the obtained positive electrode active material secondary particles by using a ball mill method or the like.

As the transition metal-containing salt, a compound including a metal generally included in a positive electrode active material may be used. Examples of the compound usable include a Mn compound, such as manganese oxide, manganese carbonate, manganese sulfate, manganese nitrate, or manganese acetate, an Ni compound, such as nickel hydroxide, nickel carbonate, nickel sulfate, nickel nitrate, or nickel acetate, and a Co compound, such as cobalt sulfate, cobalt nitrate, or cobalt acetate.

In another embodiment of the present invention, at least one of the at least two particles may be made of a positive electrode active material ingredient that forms the main body of the positive electrode active material particle, whereas the remaining particle(s) thereof may be made of a different ingredient from the positive electrode active material ingredient, and the particle(s) made of the different ingredient may be formed on a surface of the main body of the positive electrode active material particle.

Figure 3:
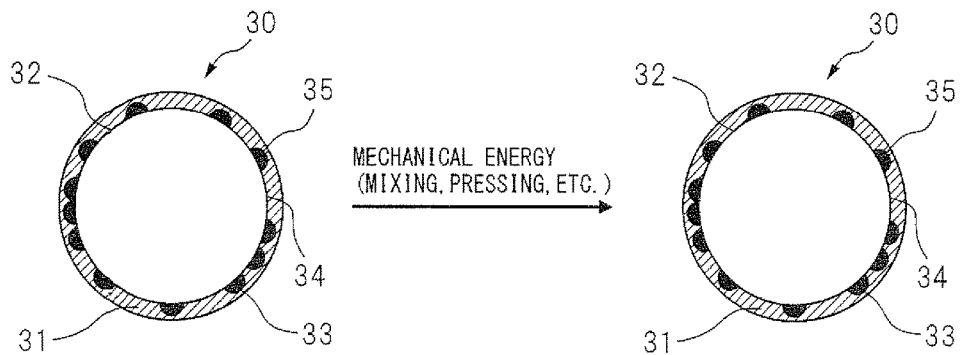
FIG. 3 is a cross-sectional schematic view of a positive electrode active material particle obtained, in another embodiment of the present invention, as a result of mixing, pressing, and the like of an active material having concave and convex portions made of a different ingredient formed on a surface thereof, a solid electrolyte, a conductive assistant, and the like by application of mechanical energy.

As depicted in FIG. 3, a different ingredient 33 is formed on a surface of a positive electrode active material main body 32 in an island shape, thereby enabling a concave portion 34 and a convex portion 35 to be formed on the surface of the positive electrode active material main body 32. Then, by forming a reaction suppressing layer 31 on the surface thereof, a positive electrode active material particle 30 of the present invention can be obtained. The different ingredient 33 is not substantially peeled off from the surface of the positive electrode active material main body 32 by a mixing step for forming a positive electrode material, a pressing step for forming a battery, or any other step. Even when mechanical energy is applied to the positive electrode active material particle 30 by mixing, pressing, or the like, the anchoring effect by the concave and convex portions enables the reaction suppressing layer 31 not to be easily peeled off.

Examples of the different ingredients usable to form the concave and convex portions on the surface of the positive electrode active material main body include inorganic ingredients, such as Zr, W, Ti, and Si, which are ingredients that do not readily dissolve in the positive electrode active material and do not significantly inhibit the function of the positive electrode active material. Zr and/or W can be preferably used.

The degree of the concave and convex portions on the surface of the positive electrode active material main body can be changed depending on the amount of the different ingredient formed on the surface of the positive electrode active material main body, and the amount of the different ingredient can be adjusted depending on the amount of the different ingredient added to the positive electrode active material. The amount of the different ingredient is preferably 0.1 to 5% by volume, and more preferably 0.2 to 1% by volume, with respect to the positive electrode active material main body.

The different ingredient occupies preferably 1 to 13%, and more preferably 1.5 to 5% of the surface of the positive electrode active material particle. The anchoring effect by the concave and convex portions is small when the percentage of the different ingredient formed on the surface of the positive electrode active material particle is too small, whereas the function of the active material tends to be deteriorated when the percentage of the different ingredient thereon is too large.

The positive electrode active material particle having a different ingredient formed on the surface thereof can be obtained by calcining a product prepared by mixing a different ingredient-containing metal oxide in a desired ratio in a mixture prepared by mixing a carbonate, a hydroxide, or a acetate containing lithium with a raw ingredient of the positive electrode active material, such as a carbonate, a hydroxide, or an acetate containing a transition metal, such as cobalt in a predetermined ratio.

In another method, a sulfate containing a transition metal, such as cobalt and a sulfate containing a different ingredient are mixed together in a desired ratio, and an alkali, such as sodium hydrogen carbonate is added to the mixture to obtain a precipitate. After filtering and drying the precipitate, lithium carbonate or the like as a lithium supply source is mixed thereto in a predetermined ratio in the dry state. Then, the obtained mixture may be calcined at a high temperature of 700 to 1000° C. for 1 to 48 hours to obtain a positive electrode active material particle having the different ingredient dispersedly formed on a surface thereof.

The ingredient of the reaction suppressing layer usable in the present invention is an ingredient that can suppress a reaction between the active material and the solid electrolyte and has lithium conductivity. Examples of such an ingredient include lithium-conductive oxides, such as $LiNbO_3$, $Li_4SiO_4$, $Li_3PO_4$, $Li_3BO_3$, $Li_2SiO_3$, $LiPO_3$, $LiBO_2$, $Li_2SO_4$, $Li_2WO_4$, $Li_2MoO_4$, $Li_2ZrO_3$, $LiAlO_2$, $Li_2TiO_3$, and $Li_4Ti_5O_{12}$, and composite oxides thereof. The ingredient used to form the reaction suppressing layer may be glass.

The thickness of the reaction suppressing layer which coats the surface of the positive electrode active material can be made into a thickness allowing both ensuring of lithium conductivity and stable suppression of a reaction between the positive electrode active material and the sulfide-based solid electrolyte. The thickness of the reaction suppressing layer is preferably about 1 to 100 nm, and more preferably about 1 to 20 nm. When the reaction suppressing layer is too thick, the lithium conductivity tends to be reduced, whereas when the layer is too thin, a noncoated portion can occur on a part of the surface of the positive electrode active material, and therefore the positive electrode active material may react with the sulfide-based solid electrolyte to form a high resistance region.

In the present invention, an active material ingredient usable for the main body of the positive electrode active material particle coated with the reaction suppressing layer may be an ingredient having a more electropositive charge/discharge potential than that of an ingredient used for a negative electrode active material and usable as an electrode active material ingredient of a sulfide-based all-solid battery. Examples of the ingredient for the main body of the positive electrode active material particle include transition metal oxides, such as lithium cobalt oxide ($LiCoO_2$), lithium nickel oxide ($LiNiO_2$), lithium manganese oxide ($LiMn_2O_4$), $LiCo_{1/3}Ni_{1/3}Mn_{1/3}O_2$, a different element-substituted Li—Mn spinel having a composition represented by $Li_{1+x}Mn_{2-x-y}M_yO_4$ (wherein M represents at least one metal element selected from Al, Mg, Co, Fe, Ni, and Zn), lithium titanium oxide ($Li_xTiO_y$), lithium metal phosphate ($LiMPO_4$, wherein M represents Fe, Mn, Co, or Ni), vanadium oxide ($V_2O_5$), and molybdenum oxide ($MoO_3$), titanium sulfide ($TiS_2$), carbon ingredients, such as graphite and hardcarbon, lithium cobalt nitride (LiCoN), lithium silicon oxide ($Li_xSi_yO_z$), lithium metal (Li), lithium alloy (LiM, wherein M represents Sn, Si, Al, Ge, Sb, or P), a lithium storable intermetallic compound ($Mg_xM$ or $N_ySb$, wherein M represents Sn, Ge, or Sb; and N represents In, Cu, or Mn), and derivatives thereof. In the present invention, there is no clear distinction between the positive electrode active material and the negative electrode active material. In a comparison of charge/discharge potentials of two electrode active materials, one having a more electropositive charge/discharge potential than the other may be used for a positive electrode and the other one having a less electropositive charge/discharge potential may be used for a negative electrode to form a battery having an arbitrary voltage.

A positive electrode mixture for an all-solid battery can be prepared by mixing the positive electrode active material particle of the present invention with a sulfide-based solid electrolyte. For example, the positive electrode active material particle of the present invention is mixed with a sulfide-based solid electrolyte in a solvent to prepare a paste, and the paste is applied and dried on a positive electrode current collector, such as aluminum foil, and then rolled out to obtain a positive electrode.

A solid electrolyte that can be used in combination with the positive electrode active material particle of the present invention is a sulfide-based solid electrolyte. The sulfide-based solid electrolyte may be a solid electrolyte including sulfur and lithium and having lithium ion conductivity. Examples of the solid electrolyte usable include sulfide-based amorphous solid electrolytes, such as $Li_2S$—$SiS_2$, LiI—$Li_2S$—$SiS_2$, LiI—$Li_2S$—$P_2S_5$, LiI—$Li_2S$—$B_2S_3$, $Li_3PO_4$—$Li_2S$—$Si_2S$, $Li_3PO_4$—$Li_2S$—$SiS_2$, $LiPO_4$—$Li_2S$—SiS, LiI—$Li_2S$—$P_2O_5$, LiI—$Li_3PO_4$—$P_2S_5$, and $Li_2S$—$P_2S_5$.

In addition, a solid electrolyte usable may be a combination of a sulfide-based solid electrolyte with an oxide-based amorphous solid electrolyte, a crystalline oxide, and/or a crystalline oxynitride, or the like. Examples of the electrolytes that can be used in combination with a sulfide-based solid electrolyte include oxide-based amorphous solid electrolytes, such as $Li_2O$—$B_2O_3$—$P_2O_5$, $Li_2O$—$SiO_2$, $Li_2O$—$B_2O_3$, and $Li_2O$—$B_2O_3$—ZnO crystalline oxides, such as $Li_{1.3}Al_{0.3}Ti_{0.7}(PO_4)_3$, $Li_{1+x+y}A_xTi_{2-x}Si_yP_{3-y}O_{12}$ (wherein A represents Al or Ga; $0 \leq x \leq 0.4$; and $0 < y \geq 0.6$), $[(B_{1/2}Li_{1/2})_{1-z}C_z]TiO_3$ (wherein B represents La, Pr, Nd, or Sm; C represents Sr or Ba; and $0 \leq z \leq 0.5$), $Li_5La_3Ta_2O_{12}$, $Li_7La_3Zr_2O_{12}$, $Li_6BaLa_2Ta_2O_{12}$, and $Li_{3.6}Si_{0.6}P_{0.4}O_4$, crystalline oxynitrides, such as $Li_3PO_{(4-3/2w)}N_w$ (W<1), LiI, LiI—$Al_2O_3$, $Li_3N$, and $Li_3N$—LiI—LiOH.

The positive electrode mixture may include other ingredients, such as a conductive assistant particle and a binder, if needed. The conductive assistant particle is not particularly limited and examples thereof include black lead and carbon black. Preferable examples of the binder include polytetrafluoroethylene, polytrifluoroethylene, polyethylene, nitrile rubber, polybutadiene rubber, butyl rubber, polystyrene, styrene-butadiene rubber, styrene-butadiene latex, polysulfide rubber, nitrocellulose, acrylonitrile-butadiene rubber, polyvinyl fluoride, polyvinylidene fluoride, and fluorine rubber, although not particularly limited.

Examples of the current collector include, but are not limited to, metal foil made of Al, Cu, Ni, or stainless steel having a thickness of about 10 to 500 μm.

Using the positive electrode active material particle of the present invention, an all-solid battery can be produced by a method known in the art. For example, an all-solid battery can be produced by stacking a positive electrode mixture formed in the above manner, a sulfide-based solid electrolyte, and a negative electrode mixture into three layers and pressure-molding.

The reaction suppressing layer can be formed on the surface of the positive electrode active material particle by an arbitrary method capable of coating a coating material on a powder. For example, a precursor solution of the reaction suppressing layer is prepared, coated and dried on the surface of the positive electrode active material main body, and then thermally treated, thereby enabling the reaction suppressing layer to be formed.

A precursor solution of a reaction suppressing layer that can be used in the present invention may be a solution of a starting ingredient of the reaction suppressing layer dissolved in a solvent, such as alcohol. For example, the precursor solution may be prepared by dissolving an ingredient containing, as a main component, a solid electrolyte, such as $LiOC_2H_5$ or $Nb(OC_2H_5)_5$ in ethanol.

The prepared precursor solution of the reaction suppressing layer may be coated on the active material as a group. The reaction suppressing layer precursor can be coated on the active material by an arbitrary method capable of coating a solution on an active material powder. For example, the coating may be performed using a tumbling fluidized bed coating machine.

The active material powder coated with the reaction suppressing layer precursor may be thermally treated to obtain a positive electrode active material particle coated with the reaction suppressing layer.

The thickness of the reaction suppressing layer coated on the positive electrode active material may be made into a thickness allowing both ensuring of lithium ion conductivity and suppression of the reaction between the positive electrode active material and the sulfide-based solid electrolyte to prevent the formation of a high resistance region. The thickness of the reaction suppressing layer is preferably about 1 to 100 nm, and more preferably about 1 to 20 nm. A too thick reaction suppressing layer tends to reduce the lithium ion conductivity, whereas a too thin reaction suppressing layer causes a noncoated portion to occur on a part of the surface of the active material, so that the reaction between the positive electrode active material and the sulfide-based solid electrolyte may occur to form a high resistance region. For example, when using a tumbling fluidized bed coating machine, the thickness of the reaction suppressing layer to be coated can be controlled by changing conditions, such as coating time.

Temperature of the thermal treatment may be a temperature allowing densification of the reaction suppressing layer to be promoted. The active material and the reaction suppressing layer easily react with each other when the thermal treatment temperature is too high. Thus, the temperature is preferably 450° C. or lower, and more preferably 400° C. or lower. Additionally, the temperature is preferably 250° C. or higher, and more preferably 300° C. or higher for densification of the reaction suppressing layer and removal of residual organic matter.

EXAMPLES

Hereinbelow, specific Examples will be given of the positive electrode active material particle of the present invention, and a positive electrode and an all-solid battery using the same.

Example 1

First, a precursor solution of a $LiNbO_3$ reaction suppressing layer was prepared. 31.1 g of ethoxylithium $LiOC_2H_5$ was dissolved in 887 g of an ethanol solvent, and then, 190.9 g of pentaethoxyniobium $Nb(OC_2H_5)_5$ was added and dissolved so that $LiOC_2H_5$ and $Nb(OC_2H_5)_5$, respectively, were contained in an amount of 0.6 mol/L in ethanol, thereby preparing a precursor solution of the $LiNbO_3$ reaction suppressing layer.

As a main body of the positive electrode active material particle, a secondary particle of $LiCo_{1/3}Ni_{1/3}Mn_{1/3}O_2$ was used. The secondary particle of $LiCo_{1/3}Ni_{1/3}Mn_{1/3}O_2$ was produced at a mole ratio of Li:Co:Ni:Mn of 3:1:1:1 by dissolving cobalt sulfate, nickel sulfate, and manganese sulfate in deionized water, adding sodium hydroxide while heating to cause precipitation, then filtering and drying the precipitate, mixing the obtained coprecipitated hydroxide precursor with lithium acetate as a lithium supply source, and calcining the mixture product at 900° C. for 24 hours.

Figure 4:
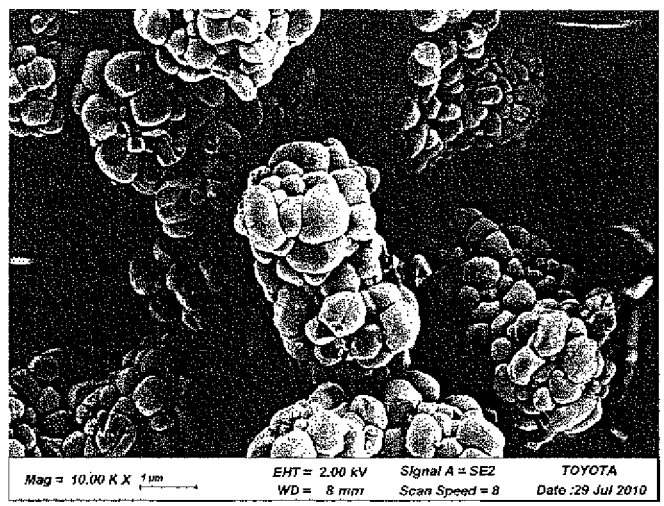
FIG. 4 is a SEM photograph of positive electrode active material secondary particles coated with a reaction suppressing layer according to the present invention.

FIG. 4 depicts an SEM photograph of the secondary particles of $LiCo_{1/3}Ni_{1/3}Mn_{1/3}O_2$. From the SEM photograph, secondary particle sizes, primary particle sizes, and the numbers of primary particles included in the secondary particles were calculated. The secondary particles had an average size of 4 μm and the primary particles had an average size of 0.7 μm. Each of the secondary particles included 187 primary particles on average.

The reaction suppressing layer precursor solution was coated on the active material by a tumbling fluidized bed coating machine (MP-01 manufactured by Powrex Corporation).

1250 g of the secondary particle of $LiCo_{1/3}Ni_{1/3}Mn_{1/3}O_2$ as a positive electrode active material powder was placed into the tumbling fluidized-bed coating machine, and then dry air set at 0.25 m³/min and 50° C. as a flowing gas was introduced. The prepared precursor solution was sprayed at 4 g/min from a spray nozzle while stirring up the positive electrode active material powder by the dry air to circulate the powder in the tumbling fluidized bed coating machine. The tumbling fluidized bed coating machine was operated for 8 hours to obtain a positive electrode active material powder coated with the precursor of the $LiNbO_3$ reaction suppressing layer.

The positive electrode active material powder coated with the precursor of the $LiNbO_3$ reaction suppressing layer was thermally treated in an electric furnace at 350° C. for 5 hours in an air atmosphere to obtain positive electrode active material particles coated with the $LiNbO_3$ reaction suppressing layer. Observations were made on the cross sections of the obtained positive electrode active material particles by a transmission electron microscope (TEM manufactured by JOEL Co., Ltd., 200 kV) and indicated that the $LiNbO_3$ reaction suppressing layer was coated on the secondary particles of $LiCo_{1/3}Ni_{1/3}Mn_{1/3}O_2$ at an average thickness of 10 nm.

Example 2

First, a precursor solution of a $Li_3BO_3$—$Li_4nO_4$ reaction suppressing layer was prepared.

Boric acid and tetraethoxysilane were dissolved in an equivalent mole ratio in an ethanol solvent so that 0.066 mol/L of boric acid, 0.066 mol/L of tetraethoxysilane, and 0.463 mol/L of lithium acetate were contained in ethanol, thereby preparing a precursor solution of a $Li_3BO_3$—$Li_4SiO_4$ reaction suppressing layer. The method for preparing the precursor solution will be described below in detail.

7.468 g of $H_3BO_4$ was added and dissolved into 141 g of ethanol in a beaker. In another beaker, 25.170 g of TEOS was added and stirred in 141 g of ethanol. The $H_3BO_4$-containing solution and the TEOS-containing solution were mixed together and stirred. Additionally, 13.05 g of deionized water was added to the mixed solution and stirred for 22 hours.

In a beaker, 86.251 g of $CH_3COO.2H_2O$ was added to 1441.4 g of ethanol and dissolved by stirring for 2 hours. The obtained solution was mixed with the solution prepared above and stirred for 20 hours to produce a precursor solution of a $Li_3BO_3$—$Li_4SiO_4$ reaction suppressing layer.

As a positive electrode active material powder, $LiCo_{1/3}Ni_{1/3}Mn_{1/3}O_2$ particles containing Zr and W were prepared. $Li_2CO_3$, $CoCO_3$, $NiCO_3$, and $MnCO_3$ were mixed together so as to have an atomic ratio of Li:Co:Ni:Mn of 3:1:1:1. Next, $ZrO_2$ and $WO_3$ were added so that Zr and W, respectively, were contained in amounts of 0.5% by weight and 0.9% by weight, respectively, on a weight basis with respect to the main body of the synthesized positive electrode active material, and the mixture was then calcined at 900° C. for 5 hours in an air atmosphere to obtain positive electrode active material particles having an average particle size of 4 μm having Zr and W dispersedly formed on surfaces of the $LiCo_{1/3}Ni_{1/3}Mn_{1/3}O_2$ particles.

The reaction suppressing layer precursor solution was coated on the active material by a tumbling fluidized bed coating machine (MP-01 manufactured by Powrex Corporation).

1250 g of the $LiCo_{1/3}Ni_{1/3}Mn_{1/3}O_2$ positive electrode active material powder having Zr and W formed on the surface thereof was placed into the tumbling fluidized bed coating machine, and dry air set at 0.25 m³/min and 50° C. as a flowing gas was introduced. The prepared precursor solution was sprayed at 4 g/min from a spray nozzle while stirring up the positive electrode active material powder by the dry air to circulate the powder in the tumbling fluidized bed coating machine. The tumbling fluidized bed coating machine was operated for 8 hours to obtain a positive electrode active material powder coated with the precursor of the $Li_3BO_3$—$Li_4SiO_4$ reaction suppressing layer.

The positive electrode active material powder coated with the precursor of the $Li_3BO_3$—$Li_4SiO_4$ reaction suppressing layer was thermally treated in an electric furnace at 350° C. for 5 hours in an air atmosphere to obtain positive electrode active material particles coated with the $Li_3BO_3$—$Li_4SiO_4$ reaction suppressing layer. Observations were made on the cross section of the obtained positive electrode active material particles by the transmission electron microscope (TEM manufactured by JOEL Co., Ltd., 200 kV) and indicated that the $Li_3BO_3$—$Li_4SiO_4$ reaction suppressing layer was coated on the active material main body at the average thickness of 10 nm.

Comparative Example 1

Figure 5:
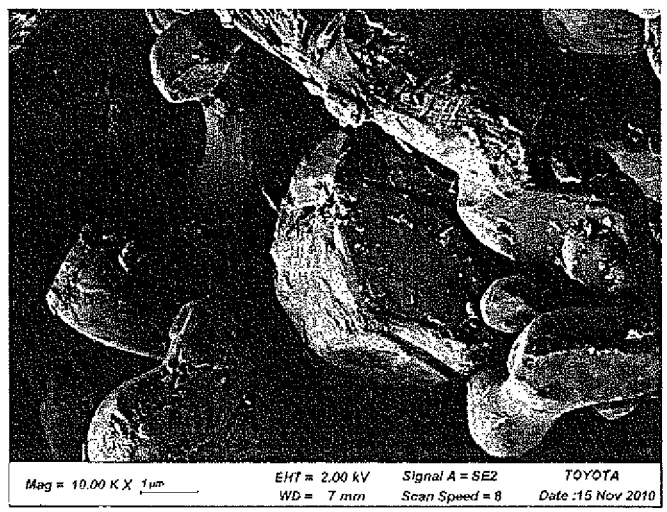
FIG. 5 is a SEM photograph of positive electrode active material primary particles coated with a reaction suppressing layer according to a Comparative Example.

Comparative Example 1 was performed in the same conditions as Example 1, except for using, as a positive electrode active material powder, primary particles of $LiCo_{1/3}Ni_{1/3}Mn_{1/3}O_2$ having an average diameter of 4 μm shown in FIG. 5.

Comparative Example 2

Comparative Example 2 was performed in the same conditions as Example 2, except for using, as a positive electrode active material powder, primary particles of $LiCo_{1/3}Ni_{1/3}Mn_{1/3}O_2$ having the average diameter of 4 μm shown in FIG. 5.

Measurements of Coating Element Ratio on Active Material Surface and Reaction Resistance All-solid batteries were produced using the positive electrode active material particles coated with the reaction suppressing layers obtained in Examples 1 and 2 and Comparative Examples 1 and 2 to measure the reaction resistances thereof. Additionally, element analysis on the surfaces of the active materials was also performed to measure coating element ratios on the surfaces of the active materials.

All-solid batteries for testing were produced in a glove box with an argon atmosphere in the following manner.

An amount of 50 mg of each of the positive electrode active material particles coated with the reaction suppressing layers obtained in Examples 1 and 2 and Comparative Examples 1 and 2 was weighed out. The four samples, respectively, together with 50 mg of a solid electrolyte $Li_2S$—$P_2S_5$, were placed in respective four sample bottles and mixed for 5 minutes by a shaker (manufactured by AS ONE Corporation, amplitude: 2000 times/min) to prepare respective four samples of 16 mg of a positive electrode mixture 80A including the positive electrode active material particles and the solid electrolyte.

50 mg of graphite carbon as a negative electrode active material and 50 mg of a solid electrolyte $Li_2S$—$P_2S_5$ were weighed out, placed in sample bottles, and mixed for 5 minutes by the shaker to prepare respective four samples of 12 mg of an negative electrode mixture 80B including the negative electrode active material particles and the solid electrolyte.

A $Li_2S$—$P_2S_5$ solid electrolyte 80C was weighed out in an amount of 50 mg for each of the four samples.

Figure 6:
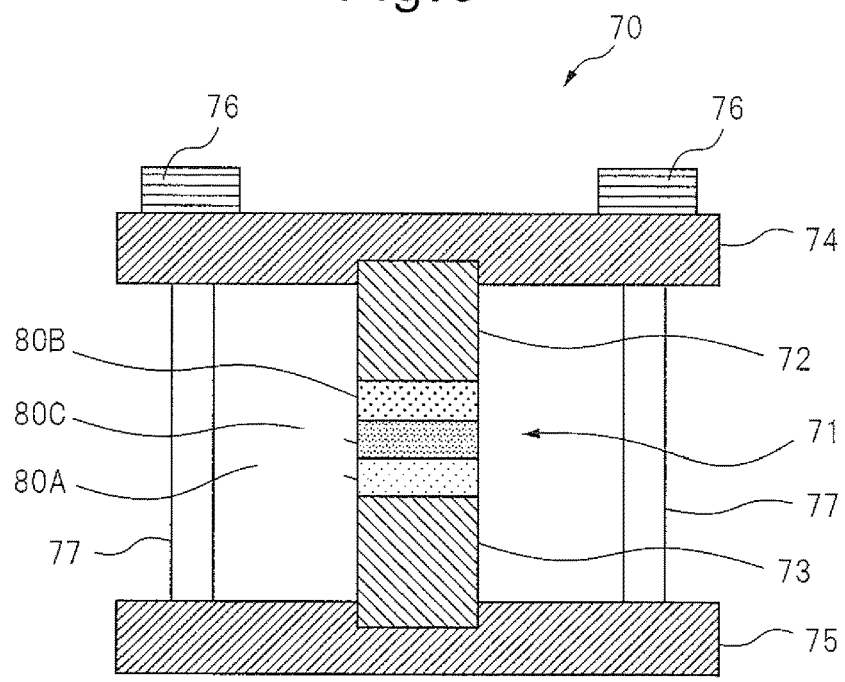
FIG. 6 is a cross-sectional schematic view of a small cell in an embodiment of the present invention.

As shown in FIG. 6, a small cell 70 provided with a cylinder 71 having an upper piston 72 and a lower piston 73 made of stainless steel was prepared. The small cell 70 includes the cylinder 71 into which the positive electrode mixture 80A, the solid electrolyte 80C, and the negative electrode mixture 80B are placed, as well as an upper base 74 and a lower base 75 made of stainless steel having a concave portion into which the cylinder 71 is fitted. The small cell 70 has a structure in which the upper base 74 and the lower base 75 are connected by base support columns 77; the upper piston 74 and the lower piston 73 can be pressed with a predetermined pressure; and the cylinder 71, the upper base 74, and the lower base 75 can be fastened with hexagon-headed bolts 76.

The sample of 16 mg of the positive electrode mixture 80A obtained from Example 1 was placed in the cylinder 71, then smoothed evenly by a spatula, and pressed at 98 MPa for 1 minute.

Next, 50 mg of the $Li_2S$—$P_2S_5$ solid electrolyte 80C was placed in the cylinder 71, smoothed evenly by the spatula, and pressed at 98 MPa for 1 minute.

Furthermore, the prepared sample of 12 mg of the negative electrode mixture 80B was placed in the cylinder 71, smoothed evenly by the spatula, and then pressed at 392 MPa for 1 minute. Next, the upper base 74 and the lower base 75 of the small cell 70 were fastened with the hexagon-headed bolts 76 to produce an all-solid battery for testing 100 for evaluation of the battery reaction resistance.

All-solid batteries for testing 100 were produced in the same manner by using the samples of 16 mg of the positive electrode mixture 80A obtained from Example 2 and Comparative Examples 1 and 2, respectively, 50 mg of the solid electrolyte 80C, and the samples of 12 mg of the negative electrode mixture 80B.

Figure 7:
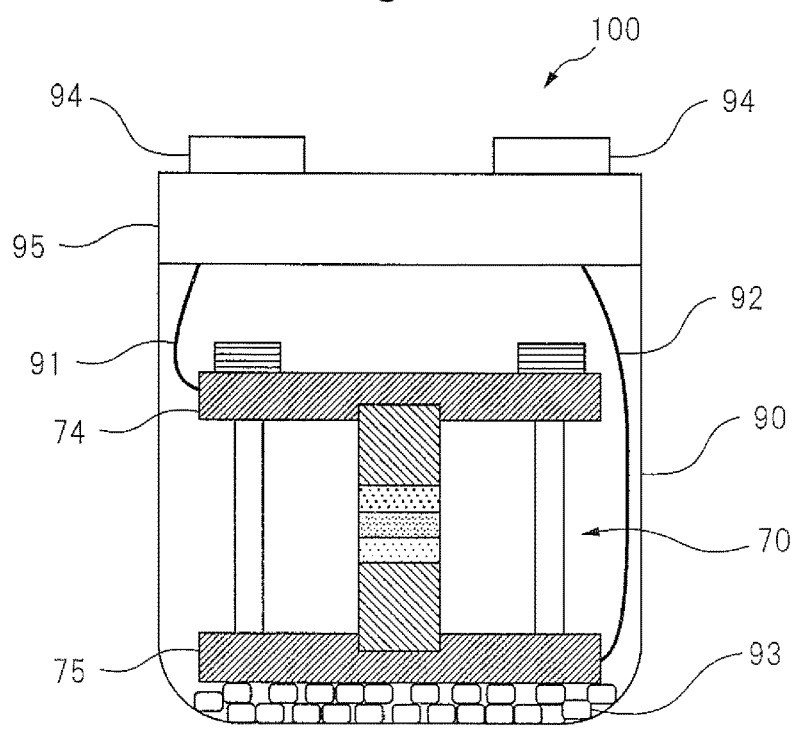
FIG. 7 is a cross-sectional schematic view of an all-solid battery for testing in an embodiment of the present invention.
Figure 9:
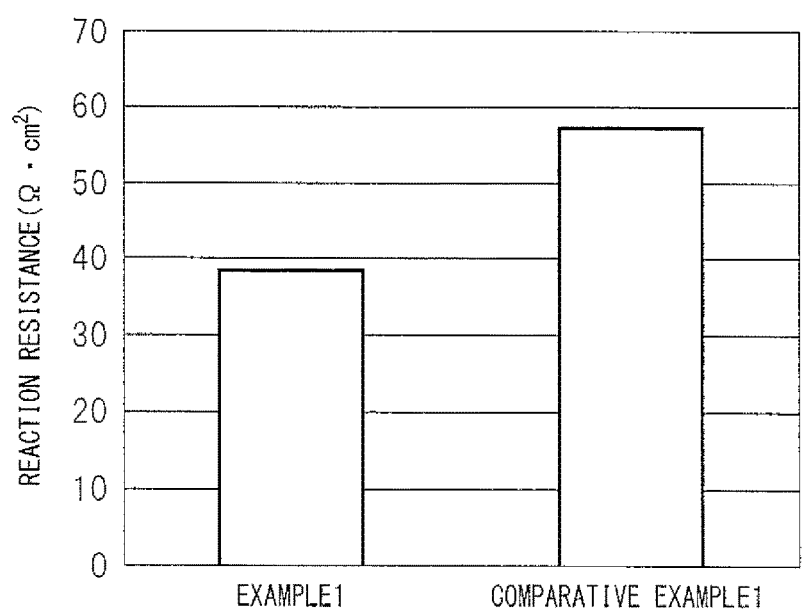
FIG. 9 is a graph depicting reaction resistances of batteries in Example 1 and Comparative Example 1.
Figure 11:
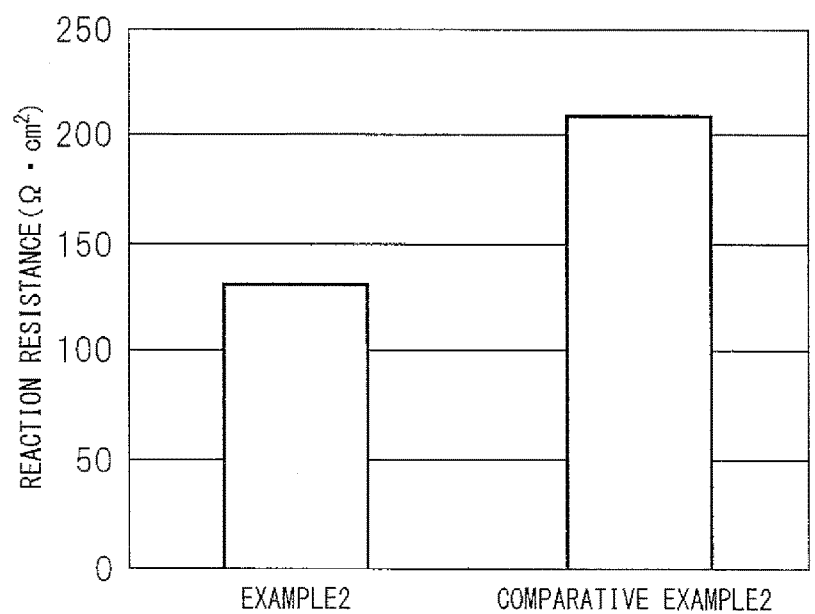
FIG. 11 is a graph depicting reaction resistances of batteries in Example 2 and Comparative Example 2.

As shown in FIG. 7, a wire 91 and a wire 92 were connected to the upper base 74 and the lower base 75, respectively, of the small cell 70, and the small cell 70 was placed in a glass cell 90 containing a desiccant 93. The glass cell 90 was tightly sealed by an aluminum lid 95 provided with connecting metal fittings 94 and an O-ring. The wires 91 and 92 were connected to an impedance analyzer via the connecting metal fittings 94 to measure impedance at an amplitude of 10 mV in a frequency range of 1 MHz to 0.1 Hz by an alternating current impedance method and measure a reaction resistance per unit area from Cole-Cole plots. FIGS. 9 and 11 indicate the measurement results regarding the reaction resistances of the batteries produced by using the positive electrode active material particles of Examples 1 and 2 and Comparative Examples 1 and 2.

From FIGS. 9 and 11, it can be seen that the battery produced in Example 1 has a smaller reaction resistance than that in Comparative Example 1, and the battery produced in Example 2 also has a smaller reaction resistance than that in Comparative Example 2.

Regarding the all-solid batteries produced by using the active material particles obtained from Examples 1 and 2 and Comparative Examples 1 and 2, a comparison was made of atomic composition percentages of coating elements on the surfaces of the active material particles after measuring the reaction resistances. Using an X-ray photoelectron spectroscopy (XPS: QUANTERA SXM manufactured by ULVAC-PHI, Inc.), the element contents of the reaction suppressing layers and the element contents of the active materials were measured to calculate coating element ratios on the surfaces of the active materials according to the following formula:

Surface coating element ratio=reaction suppressing layer element content/(reaction suppressing layer element content+active material element content).

Coating element ratios of the active material surfaces of Example 1 and Comparative Example 1 were calculated according to the following formula:

Surface coating element ratio=Nb/(Nb+Ni+Co+Mn).

Coating element ratios of the active material surfaces of Example 2 and Comparative Example 2 were calculated according to the following formula:

Surface coating element ratio=(B+Si)/(B+Si+Ni+Co+Mn).

Figure 8:
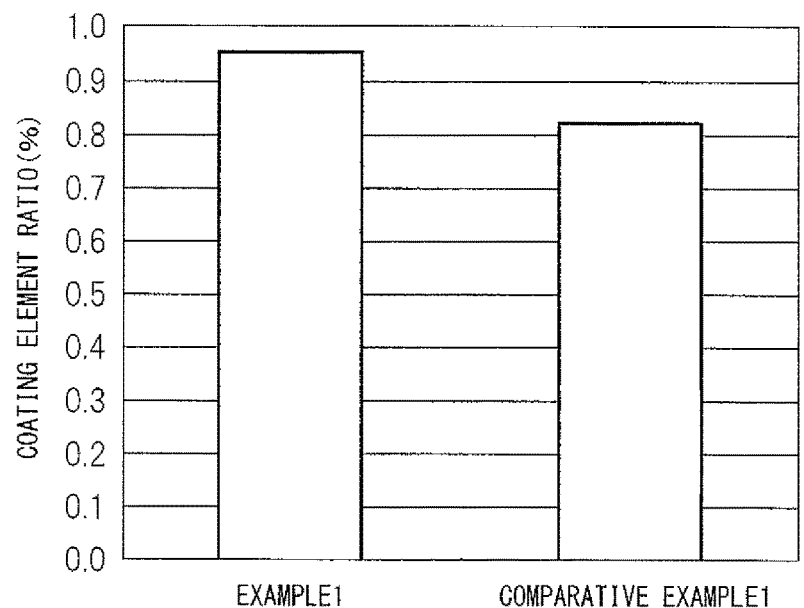
FIG. 8 is a graph depicting coating element ratios on surfaces of active materials in Example 1 and Comparative Example 1.
Figure 10:
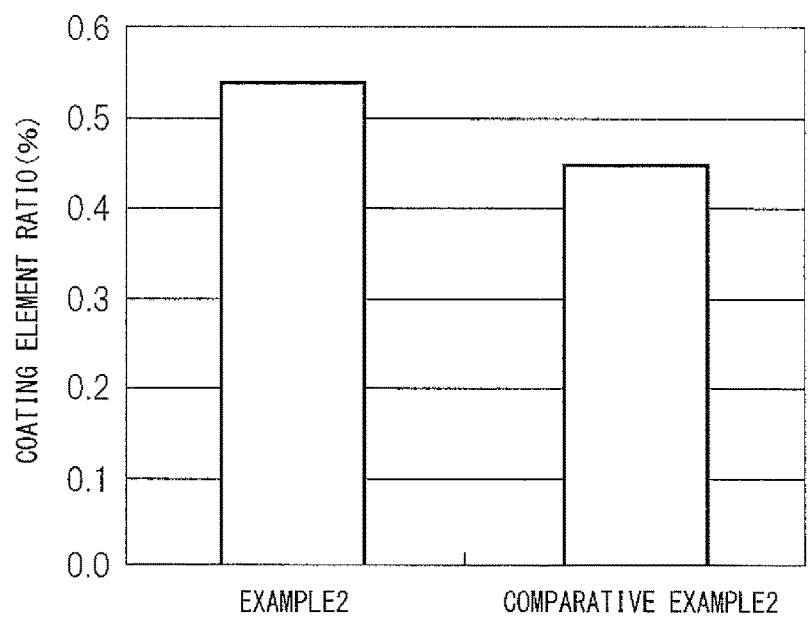
FIG. 10 is a graph depicting coating element ratios on surfaces of active materials in Example 2 and Comparative Example 2.

FIGS. 8 and 10 indicate coating element ratios on the surfaces of the active materials after the measurements of the reaction resistances of the batteries produced by using the positive electrode active material particles of Examples 1 and 2 and Comparative Examples 1 and 2.

From FIGS. 8 and 10, it can be seen that the coating element ratio on the active material particle surface of Example 1 exhibits a larger percentage of Nb as the reaction suppressing layer element than that in Comparative Example 1, and the coating element ratio on the active material particle surface of Example 2 also exhibits a larger percentage of B+Si as the reaction suppressing layer elements than that in Comparative Example 2.

The results above indicate that the formation of the concave and convex portions on the active material surface makes it difficult for the reaction suppressing layer coated on the positive electrode active material to peel off even when mechanical energy is applied, thereby suppressing the formation of a high resistance layer between the positive electrode active material and the sulfide-based solid electrolyte, enabling a battery having small reaction resistance to be produced.

DESCRIPTION OF NUMERICAL REFERENCES

10: Conventional active material particle
11: Reaction suppressing layer
12: Active material main body
20: Active material particle of the present invention
21: Reaction suppressing layer
22: Active material primary particle
23: Active material secondary particle
24: Concave portion
25: Convex portion
30: Active material particle of the present invention
31: Reaction suppressing layer
32: Active material main body
33: Different ingredient
70: Small cell
71: Cylinder
72: Upper piston
73: Lower piston
74: Upper base
75: Lower base
76: Hexagon-headed bolt
77: Base support column
80A: Positive electrode mixture
80B: Solid electrolyte
80C: Negative electrode mixture
90: Glass cell
91: Wire
92: Wire
93: Desiccant
94: Connecting metal fitting
95: Aluminum lid
100: All-solid battery for testing

The invention claimed is:

1. A positive electrode active material particle for an all-solid battery where the all-solid battery includes a sulfide-based solid electrolyte,
wherein the positive electrode active material particle is a group including at least two particles, the group including at least two particles is a group in which at least one of the at least two particles is made of a positive electrode active material ingredient that forms a main body of the positive electrode active material particle, whereas the remaining particle(s) thereof consists of a different ingredient different from the positive electrode active material ingredient and is not an active material, and the particle(s) made of the different ingredient is formed on a surface of the main body of the positive electrode active material particle,
outer surfaces of the group are coated with a reaction suppressing layer for suppressing a reaction with the sulfide-based solid electrolyte so that the reaction suppressing layer surrounds the positive electrode active material particle, and
the different ingredient is W.

2. The positive electrode active material particle according to claim 1, wherein the sulfide-based solid electrolyte is an amorphous solid electrolyte selected from the group consisting of $Li_2S-SiS_2$, $LiI-Li_2S-SiS_2$, $LiI-Li_2S-P_2S_5$, $LiI-Li_2S-B_2S_3$, $Li_3PO_4-Li_2S-Si_2S$, $Li_3PO_4-Li_2S-SiS_2$, $LiPO_4-Li_2S-SiS$, $LiI-Li_2S-P_2O_5$, $LiI-Li_3PO_4-P_2S_5$, and $Li_2S-P_2S_5$.

3. The positive electrode active material particle according to claim 1, wherein the reaction suppressing layer is made of an ingredient selected from the group consisting of $LiNbO_3$, $Li_4SiO_4$, $Li_3PO_4$, $Li_3BO_3$, $Li_2SiO_3$, $LiPO_3$, $LiBO_2$, $Li_2SO_4$, $Li_2WO_4$, $Li_2MoO_4$, $Li_2ZrO_3$, $LiAlO_2$, $Li_2TiO_3$, $Li_4Ti_5O_{12}$, and composite oxides thereof.

4. The positive electrode active material particle according to claim 1, wherein the positive electrode active material particle includes an active material ingredient selected from the group consisting of $LiCoO_2$, $LiNiO_2$, $LiMn_2O_4$, $LiCo_{1/3}Ni_{1/3}Mn_{1/3}O_2$, a different element-substituted Li-Mn spinel having a composition represented by $Li_{1+x}Mn_{2-x-y}M_yO_4$ (wherein M represents at least one metal element selected from Al, Mg, Co, Fe, Ni, and Zn), $Li_xTiO_y$, $LiMPO_4$ (wherein M represents Fe, Mn, Co, or Ni), $V_2O_5$ and $MoO_3$, $TiS_2$, carbon ingredients, LiCoN, $Li_xSi_yO_z$, Li, LiM (wherein M represents Sn, Si, Al, Ge, Sb, or P), $Mg_xM$ or $N_ySb$ (wherein M represents Sn, Ge, or Sb; and N represents In, Cu, or Mn), and derivatives thereof.

5. A positive electrode for a sulfide-based all-solid battery including the positive electrode active material particle according to claim 1.

6. A sulfide-based all-solid battery including the positive electrode according to claim 5.

7. The positive electrode active material particle according to claim 1, wherein the reaction suppressing layer is coated on the outer surfaces of the group over concave and convex portions of the outer surfaces.

8. The positive electrode active material particle according to claim 1, wherein the positive electrode active material particle is formed by mixing the positive electrode active material ingredient that forms the main body with $WO_3$ so that W is formed on the surface of the main body of the positive electrode active material particle.

9. The positive electrode active material particle according to claim 1, wherein an amount of W is in a range of 0.1 to 5% by volume with respect to the positive electrode active material main body.

10. The positive electrode active material particle according to claim 1, wherein W occupies in a range of 1 to 13% of the surface of the positive electrode active material particle.

* * * * *